United States Patent
Colotte et al.

(10) Patent No.: US 8,740,547 B2
(45) Date of Patent: Jun. 3, 2014

(54) SYSTEM FOR CONTROLLING VARIABLE GEOMETRY EQUIPMENT OF A GAS TURBINE ENGINE PARTICULARLY COMPRISING A BARREL LINK

(75) Inventors: Baptiste Benoit Colotte, Melun (FR); Bruno Robert Gaully, Marolles En Hurepoix (FR)

(73) Assignee: Snecma, Paris (FR)

( * ) Notice: Subject to any disclaimer, the term of this patent is extended or adjusted under 35 U.S.C. 154(b) by 659 days.

(21) Appl. No.: 13/121,752

(22) PCT Filed: Sep. 29, 2009

(86) PCT No.: PCT/EP2009/062624
§ 371 (c)(1),
(2), (4) Date: Jun. 13, 2011

(87) PCT Pub. No.: WO2010/037750
PCT Pub. Date: Apr. 8, 2010

(65) Prior Publication Data
US 2011/0229310 A1 Sep. 22, 2011

(30) Foreign Application Priority Data
Sep. 30, 2008 (FR) ...................................... 08 56570

(51) Int. Cl.
*F04D 29/56* (2006.01)
*F01D 17/16* (2006.01)
*F01D 17/20* (2006.01)
*F02C 6/08* (2006.01)
*F02C 9/18* (2006.01)
*F02C 9/22* (2006.01)

(52) U.S. Cl.
CPC ................ *F01D 17/16* (2013.01); *F01D 17/20* (2013.01); *F02C 6/08* (2013.01); *F02C 9/18* (2013.01); *F02C 9/22* (2013.01); *F05D 2270/58* (2013.01)

USPC .......... 415/36; 415/149.4; 415/162; 415/191; 416/47; 416/154; 416/167

(58) Field of Classification Search
CPC ........... F01D 17/16; F01D 17/20; F02C 6/08; F02C 9/18; F02C 9/22; F05D 2270/58
USPC .............. 415/36, 40, 42, 149.1, 149.2, 149.3, 415/150, 162, 191; 416/44–47, 154, 167
See application file for complete search history.

(56) References Cited

U.S. PATENT DOCUMENTS 4,292,802 A 10/1981 Snow
4,992,946 A 2/1991 Butz et al.
(Continued)

FOREIGN PATENT DOCUMENTS

DE 1 224 563 9/1966
EP 1 398 464 3/2004
(Continued)

OTHER PUBLICATIONS
International Search Report Issued Nov. 4, 2009 in PCT/EP09/062624 filed Sep. 29, 2009.

(Continued)

*Primary Examiner* — Igor Kershteyn
(74) *Attorney, Agent, or Firm* — Oblon, Spivak, McClelland, Maier & Neustadt, L.L.P.

(57) ABSTRACT

A system for controlling at least two variable geometry apparatuses of a gas turbine engine that includes at least a first body and a second body, the first apparatus including a stator blade stage with a variable setting angle of a compressor of the first body capable of switching between a closed position in an idle mode and an open position in a high-speed mode, and the second apparatus including at least one discharge valve of a compressor of the second body capable of switching between an open position in an idle mode and a closed position in a high-speed mode. The system further includes an actuator for actuating the two apparatuses.

11 Claims, 3 Drawing Sheets

(56) References Cited

U.S. PATENT DOCUMENTS

| | | |
|---|---|---|
| 6,471,471 B1 * | 10/2002 | Bouyer ............... 415/160 |
| 6,742,324 B2 * | 6/2004 | Bachelder et al. ............ 415/145 |
| 2004/0050071 A1 | 3/2004 | Bachelder et al. |
| 2006/0260307 A1 | 11/2006 | Bouru |
| 2008/0028764 A1 | 2/2008 | Cadieux |
| 2010/0080684 A1 | 4/2010 | Colotte et al. |
| 2010/0158662 A1 | 6/2010 | Colotte et al. |
| 2010/0158663 A1 | 6/2010 | Colotte et al. |

FOREIGN PATENT DOCUMENTS

| | | |
|---|---|---|
| EP | 1 724 471 | 11/2006 |
| FR | 2 445 439 | 7/1980 |
| FR | 2 633 046 | 12/1989 |
| WO | 2007 116319 | 10/2007 |

OTHER PUBLICATIONS

U.S. Appl. No. 13/379,869, filed Dec. 21, 2011, Gaully, et al.

U.S. Appl. No. 13/121,726, filed Mar. 30, 2011, Colotte, et al.

U.S. Appl. No. 13/121,706, filed Mar. 30, 2011, Colotte, et al.

* cited by examiner

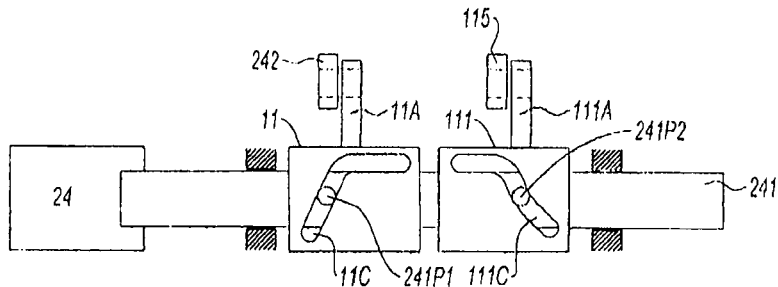
Fig. 3
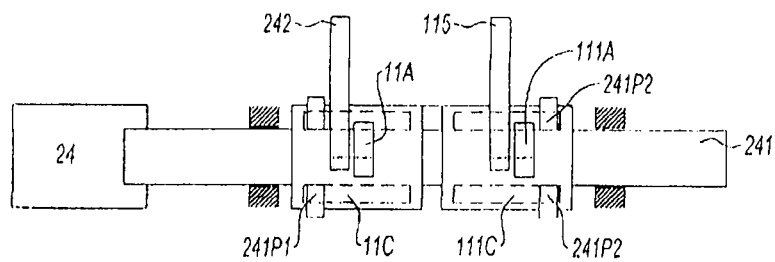
Fig. 4
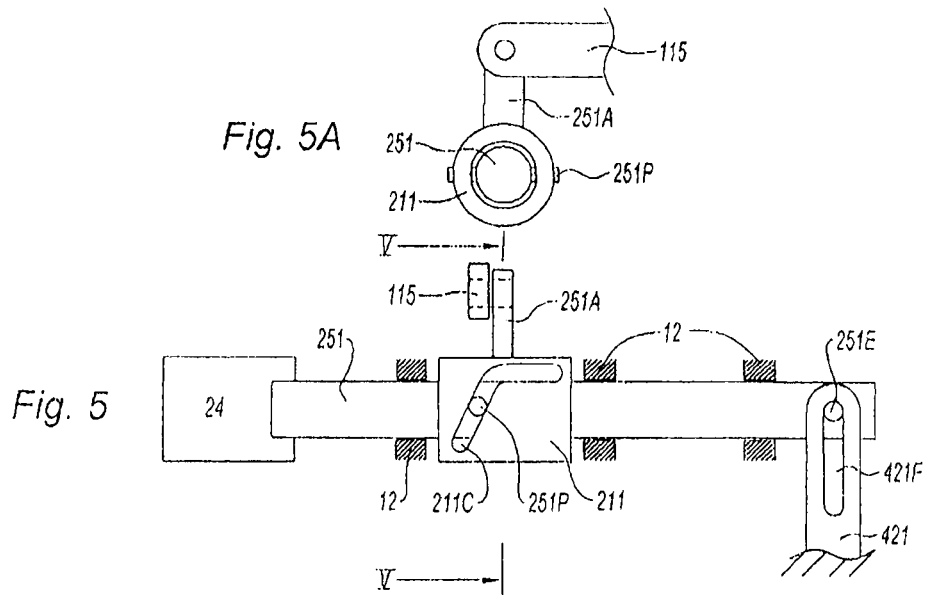
Fig. 5A
Fig. 5

SYSTEM FOR CONTROLLING VARIABLE GEOMETRY EQUIPMENT OF A GAS TURBINE ENGINE PARTICULARLY COMPRISING A BARREL LINK

The present invention relates to the general field of the control of variable geometry equipment items of a gas turbine engine, notably a jet engine. The invention relates more particularly to the optimization of the control of several equipment items forming part of separate bodies of the gas turbine engine.

The expression "variable geometry equipment item" should be understood here to mean an equipment item linked to a control member and the dimension, the shape, the position and/or the speed of which is or are able to be modified on the basis of detected events or defined parameters, in order to act on the operation of the engine. Examples of variable geometry equipment items include air discharge valves of the compressor (with variable opening), fixed compressor vanes with variable setting angle, turbine vanes whose clearance at the tip is variable, variable flow rate fuel pumps, etc.

The term "body" designates a subassembly of the gas turbine engine, comprising as main members a compressor and a turbine assembled on one and the same axis. It may be multibody. A dual-body engine comprises a so-called high-pressure body and a so-called low-pressure body. Each body includes a compressor and a turbine, the vanes of which are driven in rotation about the axis of the shaft on which they are mounted.

In general, the various bodies of a gas turbine engine are designed to operate independently of one another. Their rotation speeds are independent, even if they are linked or correlated at certain operating speeds.

To control variable geometry equipment items forming part of different bodies, distinct control systems are provided for these distinct equipment items: two control circuits, two actuators, two power sources, etc. It follows that the weight, the cost and the bulk of such an equipment item control system are relatively high. Such a configuration is the one retained in the applicant's European Patent Application, published under the number EP 1 724 474.

For example, the compressor of the low-pressure body may include one or more air discharge valves (often designated VFW, standing for "Variable Bleed Valve"), whereas the compressor of the high-pressure body may include one or more variable-angle stator vane stages (often designated VSV, which stands for "Variable Stator Vane"). To reduce the weight of these equipment items and their control members, it is possible to envisage not installing any VBVs. While the saving achieved in this way is significant (the actuators, the servo-valves, the ducting, the harnesses and so on that are associated with them are eliminated), the drawbacks are significant, notably at idling speed if water or hail penetrates into the engine, leading to an increased risk of extinction thereof.

The Patent Application FR 2 445 439 from General Electric Company describes a single means for controlling air discharge valves of a low-pressure stage and variable-angle stator stages of a high-pressure stage, but this means controls both equipment items essentially sequentially, only the stator vanes being actuated in normal operation of the turbine engine (that is to say, above idling speed).

The invention aims to propose a gas turbine engine with variable geometry equipment items belonging to different bodies of the engine and a control system for these equipment items that is optimized.

Thus, the invention relates to a system for controlling at least two variable geometry equipment items of a gas turbine engine, the engine comprising at least a first body rotating at a first speed and a second body rotating at a second speed, the first equipment item being a variable-angle stator vane stage of a compressor of the first body moving between a closed position when idling and an open position at high speed, the second equipment item being at least one discharge valve of a compressor of the second body moving between an open position when idling and a closed position at high speed, characterized in that it includes an actuator which actuates both equipment items.

By using a single actuator to control several (at least two) variable geometry equipment items, the control system makes it possible to reduce the number of parts of the engine and thus achieve the objective of the invention. The weight, the volume and the cost of a second control system are, at least largely, avoided, since the equipment items of the first and second bodies are actuated by the same actuator.

According to one embodiment, the control system is able to control more than two variable geometry equipment items using a single actuator.

According to one embodiment, the first body being driven at a speed of rotation, the actuator is controlled by the speed of rotation of the first body.

Thus, the equipment item of the second body is controlled by the speed of rotation of the first body, via the actuator.

According to a particular embodiment, the first body is a high-pressure body and the second body is a low-pressure body.

In particular, the gas turbine engine comprising a low-pressure compressor and a high-pressure compressor, the variable geometry equipment item of the low-pressure compressor is controlled by the speed of rotation of the high-pressure compressor.

According to one embodiment, in the case of a gas turbine engine with a high-pressure body and a low-pressure body, the variable geometry equipment items of the high-pressure body are located close to the low-pressure body (for example, close to the upstream side of the high-pressure body).

According to a particular embodiment in this case, the gas turbine engine is dual-body, with a high-pressure body and a low-pressure body. Preferably in this case, the variable-angle stator vane stage(s) form(s) part of the high-pressure body, the first equipment item controlled by the control system forming part of the low-pressure body.

According to a particular embodiment in this case, the vane stage comprises a plurality of vanes, each mounted to pivot on a casing of the turbine engine, and a control ring surrounding the casing is linked to each of the vanes of the stage via levers, the actuator being able to drive the control ring of the stage in rotation via a driving member mounted on the casing.

According to one embodiment, a variable geometry equipment item is an air discharge valve of the turbine engine. This equipment item may comprise one valve or a plurality of air discharge valves. It is, for example, an air discharge valve of the VBV type downstream of the low-pressure compressor.

In this particular case, the invention presents the following advantages:

only a single set of actuators is needed instead of two, as well as associated service means, namely ducting, servo-valves, outlets on the HMU or electric motor, etc.

A degree of freedom concerning booster performance is retained without adding complete variable geometry.

There is a saving in maintenance capacity: in practice, the elimination of the VBV actuation eliminates the risks of failures on this variable geometry.

The capacity to evacuate water or hail at low speed is retained. There follows a better robustness to extinction of the chamber when idling compared to a booster architecture without VBV.

The electric system is simplified. A local servo-control loop is eliminated: computer output, harness, position return sensor (TBC), reduced computer dimensioning, etc.).

The control system of the invention may also be adapted for the control of various types of equipment items. In addition to those discussed hereinabove, the variable geometry equipment items may notably include or form an element of one or more of the following devices:
- an air discharge valve of the high-pressure compressor with proportional opening (often designated "Transient Bleed Valve" (TBV) or "Start Bleed Valve" (SBV));
- an on or off air discharge valve of the high-pressure compressor (often designated "Handling Bleed Valve" (HBV));
- an air flow rate regulation valve contributing to the control of clearance in a low-pressure turbine (often designated "Low Pressure Turbine Active Clearance Control" (LP-TACC)), or in a high-pressure turbine (often designated "High Pressure Turbine Active Clearance Control" (HP-TACC)).

According to one embodiment, in the control system, the actuator includes a mobile control member, the displacements of which transmit the control to the variable geometry equipment items. The control member may, for example, include the arm of a cylinder.

According to one embodiment, the actuator is arranged to actuate the first variable geometry equipment item by varying a parameter within an actuation band of the first equipment item, the actuator being arranged to actuate the second variable geometry equipment item by varying the same parameter within an actuation band of the second equipment item.

The parameter of the actuator indicated hereinabove may, for example, be the position of the actuation member of the actuator. Thus, this parameter may be the position of the end of the arm of a cylinder. Thus, in this case, varying this parameter means displacing the end of the arm of the cylinder or the position of the working end of the actuator.

According to a preferred embodiment, the control system in which the actuator controls a rod on which is mounted a barrel control member, the barrel control member driving one of the two equipment items and being linked to said rod by a link by which it is driven, said link comprising a pin that is mobile in a guiding track, the profile of the guiding track determining the actuation law for said equipment item according to the displacement of the rod of the actuator.

According to one embodiment, the rod drives the other equipment item.

According to another embodiment, the system comprises a second barrel control member driving the other equipment item and being driven by the rod also by a link comprising a pin that is mobile in a guiding track, the profile of the guiding track determining the actuation law for said other equipment item according to the displacement of the rod controlled by the actuator.

When the actuation parameter varies within a range located outside of the actuation band of an equipment item, the latter is not actuated by the actuator. Such a range of values of the parameter of the actuator, in which no action is actually applied to the equipment item concerned, constitutes for said equipment item a "dead travel". Within such a band, regardless of the variations of the parameter, the actuator does not act (or does not act significantly) on the equipment item concerned.

According to a particular embodiment, at least a part of the actuation band of the first equipment item is outside of the actuation band of the second equipment item.

The control of two variable geometry equipment items by a single actuator may be facilitated by the fact that the actuation bands of the two equipment items do not totally correspond, enabling only a single equipment item to be actuated outside of the common region.

According to another particular embodiment, the actuation bands of the first and second equipment items are separate, that is to say that the actuation band of the first equipment item is entirely outside of the actuation band of the second equipment item (the plates do not intersect).

Thus, the equipment items may be actuated sequentially. In practice, when the parameter of the actuator is varied within the actuation band of the first equipment item, these variations induce almost no movement, have no effect on the second equipment item, and vice versa.

According to a particular embodiment, the actuation band of one of the first and second equipment items is entirely contained within the actuation band of the other equipment item.

In this case, the equipment items are actuated simultaneously within their common region, which may present advantages depending on the nature of the equipment items. Such an embodiment may make it possible to provide a greater actuation amplitude.

According to a particular embodiment in this case, the actuation band of one of the equipment items has an amplitude very much less than the overall amplitude of the actuation band of the other equipment item; for example, it may represent less than 20% or less than 10% of this band. This way, when the band of the equipment item with the reduced actuation band is included within the band of the other equipment item, the equipment item control actions lead to only a small and/or insensitive variation of the control of the other equipment item. This arrangement facilitates the control, with a single control system, of two equipment items.

The control system is preferably arranged for the variations of the parameter of the actuator between the limits of its actuation band to be sufficient to actuate the equipment items with sufficient amplitude.

According to one embodiment, the link between the actuator and one of the equipment items comprises a declutching device, able to declutch the driving of this equipment item by the actuator over a band of values of the actuation parameter. This band of values is therefore located outside of the actuation band of the equipment item concerned. Thus, the declutching device makes it possible to reserve a range of the actuation band for the sole control of the other equipment item or items. This may be essential when the equipment item concerned must not be affected even when the control of one of the other controlled equipment items varies.

According to one embodiment, the control system also comprises return means maintaining a control member of one of the equipment items in a predetermined position, at least when the parameter of the actuator varies within a range located outside of the actuation band of the equipment item.

The invention also relates to a gas turbine engine equipped with the control system described hereinabove.

The invention will be better understood from the following description of the preferred embodiment of the engine and of the system of the invention, with reference to the appended drawing plates, in which:

FIG. 3 is a plan diagrammatic view of a device for controlling the position of the two equipment items;

FIG. 4 is a side diagrammatic view of the device of FIG. 3;

FIG. 5 is a diagrammatic view of another embodiment with a single barrel control member;

FIG. 5A is a cross section of FIG. 5 in the direction V-V;

Figure 1:
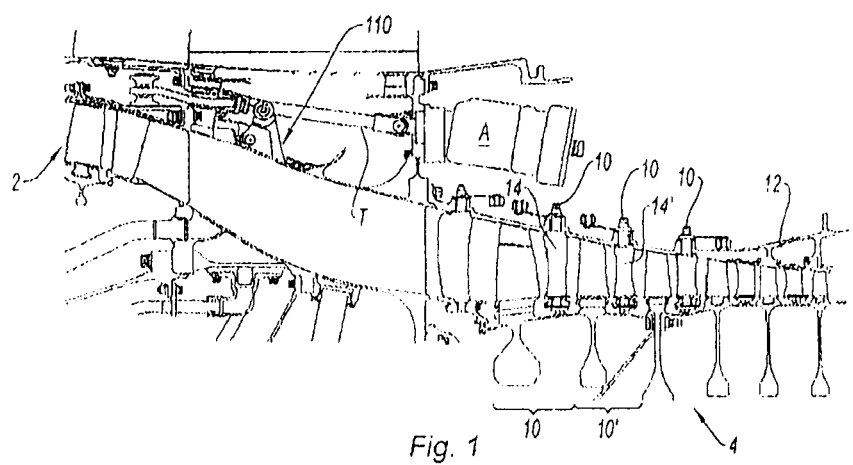
FIG. 1 represents an axial cross section of a part of a jet engine of the prior art comprising a discharge valve VBV and variable stator fins.
Figure 2:
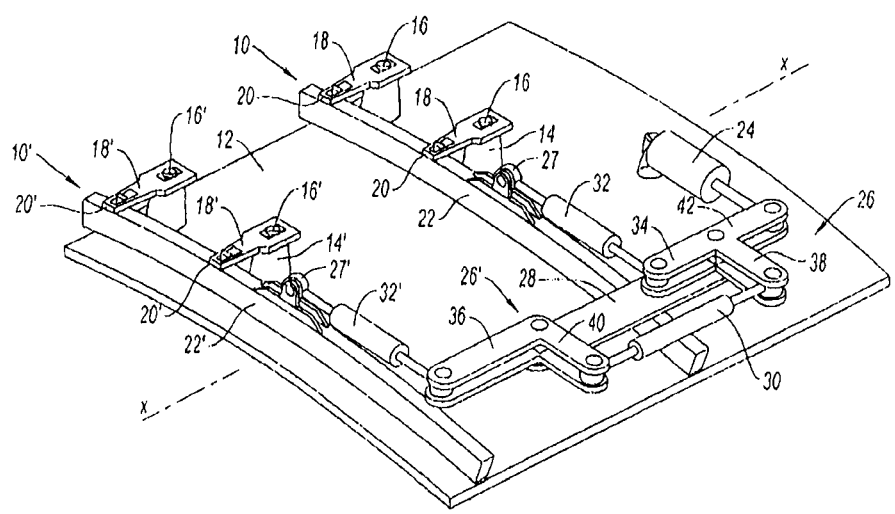
FIG. 2 represents a perspective view of a VSV control system according to the prior art.

As is known, as represented in FIGS. 1 and 2, a gas turbine engine applicable to the aeronautical domain such as a jet engine, in this case of axis X-X, comprises, from upstream to downstream, a fan, a low-pressure compressor 2, a high-pressure compressor 4, a combustion chamber, a high-pressure turbine, a low-pressure turbine and a nozzle for ejecting gases (not represented). The compressor and the high-pressure turbine are firmly attached to one and the same shaft, called the high-pressure shaft, and thus belong to the high-pressure body of the engine or first body revolving at a first speed, whereas the low-pressure compressor and the low-pressure turbine are firmly attached to one and the same shaft, called the low-pressure shaft, and thus belong to the low-pressure body of the engine or second body revolving at a second speed.

Hereinbelow, the abbreviations LP and HP will be used respectively for low pressure and for high pressure.

The HP compressor 4 comprises at least one stage formed by a wheel of mobile vanes and a wheel of fixed vanes (also called stator vanes). Each stage is formed by a plurality of vanes positioned radially around the axis X-X of the turbine engine. In the case in point, the HP compressor comprises a plurality of stages, with alternating mobile vane wheels and fixed vane wheels.

The vanes are enclosed by a cylindrical casing 12 which is centered on the axis X-X of the turbine engine.

Among the fixed vane wheels, at least one stage 10 includes so-called variable-angle vanes 14. Each vane 14 is mounted to pivot about an axis 16 (or pivot) which passes through the casing 12. The angular position of each vane 14 can be adjusted by driving its pivot 16 in rotation.

The variable-angel vane stage 10 forms a first variable geometry equipment item, belonging to the HP body (since it belongs to the HP compressor). The variable parameter of this equipment item is the angle of the vanes 14; in the case in point, all the vanes 14 are driven simultaneously in rotation, by virtue of a control ring 22 of the stage 10 of vanes 14.

The control ring 22 is of overall circular shape; it surrounds the casing 12 and is centered on the axis X-X of the turbine engine. The synchronized modification of the angular position of the vanes 14 is thus obtained by a rotation of the control ring 22 about the axis X-X of the engine, in a known manner.

FIG. 2 shows a synchronized control mechanism for two stator vane stages, 10 and 10' of the prior art. The control system is arranged to control the rotation of the control rings 22 and 22' of the variable-angle vane stages 10 and 10'.

The control system includes an actuator 24, in this case a cylinder, which is mechanically linked to the stage 10 to drive the stator vanes in rotation. To this end, each pivot 16, 16' of the variable-angle vanes 14, 14' is linked to one end of a control connecting rod 18, 18', the other end of which is articulated about a trunnion 20, 20' fixed to the control ring 22, 22' and extending radially relative to it.

The ring comprises at least one end fitting 27, 27' to which is fixed one end of a control rod 32, 32', of the stretching screw type, extending roughly tangentially to the ring 22, 22'. The other end of the control rod is firmly attached to a return member 26, 26', mounted to pivot on a module 28 of the casing 12 of the compressor. The driving return member 26 is T-shaped. The control rod 32 is fixed to one end of a first branch 34 of the driving return member 26, the end of the rod of the cylinder 24 being fixed, in an articulated manner, to the end of a second branch 42 which is located roughly in the extension of the first branch 34.

The following return member 26' is L-shaped with a branch 36 linked to the rod 32' and a branch 40 linked via a synchronization bar to the third branch 38 of the T. The actuator (cylinder) 24 may drive the control ring 22 of the variable-angle vane stage 10 in rotation via the driving return member 26, which transmits the movement of the cylinder 24 to the control rod 32 which in turn transmits the movement to the ring 22 to which it is securely attached in translation (curvilinear). The actuator drives the control ring 22' in rotation via the synchronization bar 30. The cylinder 24 is controlled by an electronic control unit. Its movements depend on the speed N2 of rotation of the HP compressor.

The engine, as can be seen in FIG. 1, comprises a second variable geometry equipment item 110. In the case in point, it is an air discharge valve, of the VBV type. The variable parameter of this equipment item 110 is the opening angle of the discharge valve 110. This equipment item 110 is positioned downstream of the LP compressor. The function of the VBV valve 110 is to discharge air at the outlet of the LP compressor 2 according to defined operating conditions. The second equipment item 110 generally includes a plurality of such valves.

According to the prior art, the equipment item 110 is controlled by a system specific to it. FIG. 1 shows the actuator A which acts via a linkage system T on the valve.

According to the invention, a system is provided that jointly controls the two equipment items. Thus, the actuator 24 which controls the VSV vanes also controls the displacement of a control member 115 for the second equipment item 110, using a specific device.

Referring to FIGS. 3 and 4 the actuator 24 can be seen with the rod and its link to the arm 42 modified. The rod 241 of the actuator is still mobile in translation. It slides in a first barrel 11 and a second barrel 111. These two barrels are cylindrical and axially immobilized. They can, however, pivot about the axis of the rod 241, by being being supported on the rod by a ball bearing for example. They are each provided with two guiding tracks, 11C and 111C respectively, in which are guided pins 241P1 and 241P2 that are radial and firmly attached to the rod 241. Each barrel 11 and 111 also includes a radial lug 11A and 111A respectively. The lugs are linked by a swiveling attachment to a control member 242 for the barrel 11 and 115 for the barrel 111. The member 242 is linked to the control arm, such as 42, for the first equipment item; in this case, it is the equipment item for the VSVs. The control member 115 is linked to the second equipment item 110 that it controls, in this case the discharge valves VBV.

The actuation system operates as follows. The actuator 24, by axially displacing the rod 241, acts on the barrels 11 and 111 via 241P1 and 241P2 which slide inside guiding tracks 11CA and 111C respectively. In this example, the rod 241 cannot rotate on itself and the barrels are mounted to rotate and slide on the rod, by a ball race mounting for example, while being axially immobilized relative to the casing. Thus, the displacement of the pins inside the guiding tracks drives the rotation of the barrels about the axis of the rod of the actuator according to the profile of the tracks. It will be understood that it is sufficient to correctly position the guiding tracks 11C and 111C to define the driving law for the two equipment items by the movement of the members 115 and 242. Thus, an axial track portion on a barrel does not lead to any rotation of the latter when the corresponding pin is displaced along said axial track portion, nor is there any displacement of the attached member. It is a dead travel portion. Moreover, a gearing-down of the movement can be obtained by choosing appropriate lengths for the lever-forming lugs 11A and 111A.

According to a variant embodiment that is not represented, an actuator is used whose rod rotates on itself instead of being moved in translation. In this case, the movement of the barrels is also modified. They are thus mobile in translation and the control of the equipment items is adapted accordingly.

According to another embodiment represented in FIGS. 5 and 5A, there is a single barrel on the rod of the actuator. The actuator 24 has a rod 251 that slides axially relative to the casing 12. The rod controls the rotation of a bell crank 421 that acts on the variable-angle vanes VSV when it pivots about an axis 421A. A slot 421F is provided on the axis of the bell crank in which slides a pin 251E that is securely attached to the rod to enable the translational movement to be converted into rotation of the bell crank. A barrel 211 is mounted on the rod 251. As in the previous embodiment, the barrel is mounted to rotate and slide on the rod. It is, however, axially immobilized relative to the casing 12 which supports the assembly. The rod comprises a pair of radial pins 251P which cooperate with a guiding track 211C provided on the wall of the barrel 211. A radial lug 251A on the barrel 211 is linked to the actuation member 115 for the discharge valves VBV.

The operation of the system of FIG. 5 is as follows over a portion of the travel of the rod 251 from a retracted position, in which the discharge valves VBV are in the open position and the vanes VSV are in the closed position. By being displaced gradually to the right in relation to the figure, the rod drives the vanes VSV which open. During this portion of the travel of the rod 251, the barrel 211 pivots about the axis of the rod 251 because of the profile of the guiding track and because of the cooperation of the latter with the pins 251P. The profile of the track is adapted so as to drive the rotation of the barrel about the axis of the rod and the displacement of the control member for the discharge valves toward closure. When the pins 251P are in the portion of the track that is oriented in the axis of the rod, the barrel no longer rotates even though the rod continues to extend and continues with the opening of the stator vanes VSV. At end of travel, the discharge valves are closed and the vanes are opened. This sequence of operations is reversible.

According to a variant, it is possible to reverse the controls for the stator vanes VSV with those for the discharge openings VBV.

It is also possible to modify the operation of the rod into rotational movement.

Figure 6:
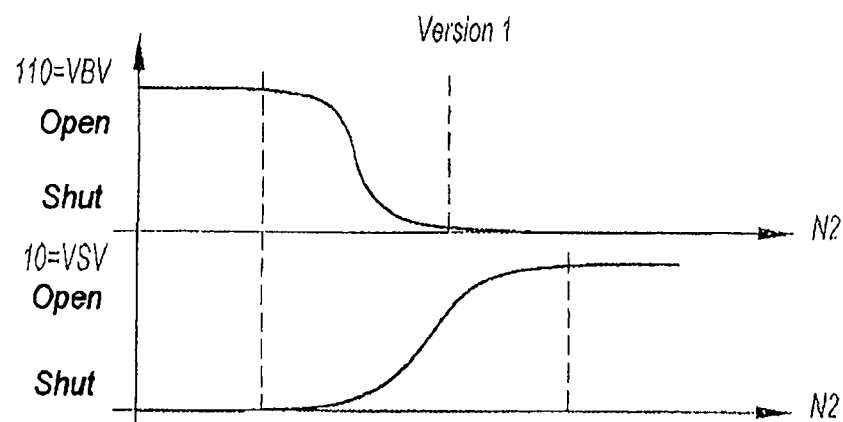
FIGS. 6 and 7 are curves giving the position of the stator vanes and of the discharge valves according to the speed of the engine, in the case of an overlap and in the case of an absence of overlap of the opening and closure bands of the two equipment items.
Figure 7:
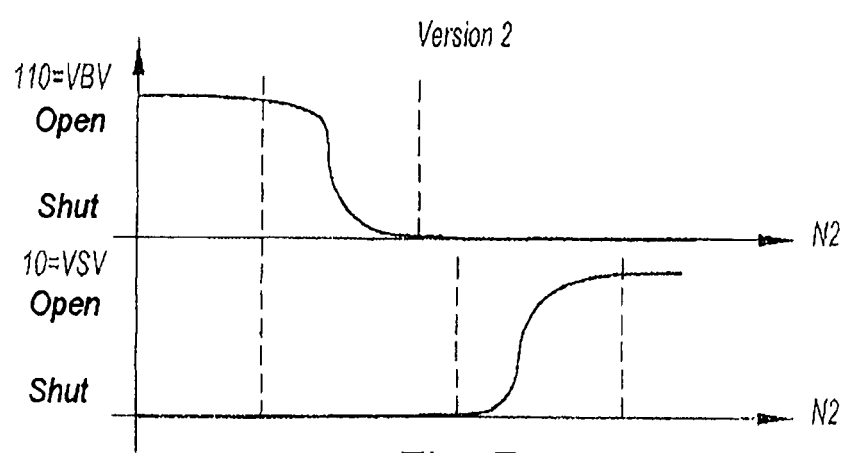

Referring to FIGS. 6 and 7, the relative opening laws for the variable-angle vanes (referenced 10 or VSV) and for the discharge valves (referenced 110 or VBV) according to the rotation speed N2 of the HP body can be seen. At zero speed, the discharge valves are open and the variable-angle vanes are closed. In the version V1 represented in FIG. 7, as the speed N2 increases, the opening of the variable-angle vanes VSV begins at the same time as the closure of the discharge valves VBV but ends after, whereas, in the version V2, represented by FIG. 7, it begins only after their closure. The choice of a version and the precise moment at which the closure of the discharge valves begins are defined by the profile of the guiding tracks provided on the barrels. Extending the axial track portions on the barrel 111 or the barrel 211 delays the start of closure of the discharge valves, whereas shortening it advances it.

Although the invention has been described in relation to a number of particular embodiments, it is obvious that it is in no way limited thereto and it includes all the technical equivalents of the means described and their combinations if they fall within the context of the invention.

The invention claimed is:

1. A system for controlling at least two variable geometry equipment items of a gas turbine engine, the engine including at least a first body rotating at a first speed and a second body rotating at a second speed, the first equipment item being a variable-angle stator vane stage of a compressor of the first body moving between a closed position when idling and an open position at high speed, the second equipment item being at least one discharge valve of a compressor of the second body moving between an open position when idling and a closed position at high speed, the system comprising:
an actuator that actuates the first and second equipment items,
wherein the actuator controls a rod on which is mounted a barrel control member, the barrel control member driving one of the first and second equipment items and being linked to the rod by a link via which it is driven,
the link comprising a pin that is mobile in a guiding track, a profile of the guiding track determining at least one actuation law for the one equipment item according to displacement of the rod of the actuator.

2. The control system as claimed in claim 1, in which the first body is a high-pressure body and the second body is a low-pressure body.

3. The control system as claimed in claim 1, in which the actuator is controlled according to a speed of rotation of one of the first and second bodies of the engine.

4. The control system as claimed in claim 2, in which the actuator is controlled according to a speed of rotation of one of the first and second bodies of the engine.

5. The control system as claimed in claim 2, in which the actuator is controlled by the speed of rotation of the high-pressure body.

6. The control system as claimed in claim 4, in which the actuator is controlled by the speed of rotation of the high-pressure body.

7. The system as claimed in claim 1, in which the rod drives the other equipment item.

8. The system as claimed in claim 1, further comprising a second barrel control member driving the other equipment item and being driven by the rod also by a link comprising a pin that is mobile in a guiding track, the profile of the guiding track determining the actuation law for the other equipment item according to the displacement of the rod controlled by the actuator.

9. The control system as claimed in claim 1, in which each actuation law for the equipment items each comprise an actuation band, the actuation band of one of the equipment items being included within the actuation band of the other equipment item.

10. The control system as claimed in claim 1, in which each actuation law for the equipment items each comprise an actuation band, the actuation band of the second equipment item being entirely outside of the operating band of the first equipment item.

11. A gas turbine engine comprising a control system as claimed in claim 1.

* * * * *

UNITED STATES PATENT AND TRADEMARK OFFICE
CERTIFICATE OF CORRECTION

PATENT NO. : 8,740,547 B2  
APPLICATION NO. : 13/121752  
DATED : June 3, 2014  
INVENTOR(S) : Baptiste Benoit Colotte et al.

Page 1 of 1

It is certified that error appears in the above-identified patent and that said Letters Patent is hereby corrected as shown below:

In the Specification

Column 1, line 44, change "VFW" to --VBV--.

Column 6, line 47, delete the second occurrence of "being";
line 62, change "11CA and 111C" to --11C and 111C--.

Signed and Sealed this
Eleventh Day of November, 2014

Michelle K. Lee
*Deputy Director of the United States Patent and Trademark Office*